United States Patent
Cohen

(10) Patent No.: US 8,967,456 B2
(45) Date of Patent: Mar. 3, 2015

(54) METHOD FOR TAGGING ELEMENTS IN A USER INTERFACE

(75) Inventor: Aaron M Cohen, Westford, MA (US)

(73) Assignee: International Business Machines Corporation, Armonk, NY (US)

( * ) Notice: Subject to any disclaimer, the term of this patent is extended or adjusted under 35 U.S.C. 154(b) by 877 days.

(21) Appl. No.: 13/116,729

(22) Filed: May 26, 2011

(65) Prior Publication Data

US 2012/0304089 A1    Nov. 29, 2012

(51) Int. Cl.
  *G06F 17/00* (2006.01)
  *G06F 11/07* (2006.01)

(52) U.S. Cl.
  CPC .................................. *G06F 11/0766* (2013.01)
  USPC ...................... 235/375; 235/462.01

(58) Field of Classification Search
  USPC ........ 235/375, 462.01, 462.09; 715/764, 765, 715/767
  See application file for complete search history.

(56) References Cited

U.S. PATENT DOCUMENTS

| | | | |
|---|---|---|---|
| 4,948,955 A | 8/1990 | Lee et al. | |
| 5,493,106 A | 2/1996 | Hunter | |
| 5,698,833 A | 12/1997 | Skinger | |
| 7,410,099 B2 | 8/2008 | Fukasawa et al. | |
| 7,537,162 B1 | 5/2009 | Siu | |
| 8,171,406 B1 * | 5/2012 | Newstadt et al. | 715/700 |
| 2008/0288856 A1 * | 11/2008 | Goranson et al. | 715/208 |
| 2010/0225653 A1 | 9/2010 | Sao et al. | |
| 2011/0307833 A1 * | 12/2011 | Dale et al. | 715/835 |
| 2012/0124469 A1 * | 5/2012 | Nakajima et al. | 715/702 |
| 2013/0073956 A1 * | 3/2013 | Marti et al. | 715/704 |

OTHER PUBLICATIONS

"4K Resolution" Wikipedia.com, 2 pages. Available at http://en.wikipedia.org/wiki/4K_resolution, last accessed May 25, 2011.
"Graphic Display Resolutions", Wikipedia.com, 17 pages. Available at http://en.wikipedia.org/wiki/Graphic_display_resolutions#QFHD_.282160p.29, last accessed May 25, 2011.

* cited by examiner

*Primary Examiner* — Ahshik Kim
(74) *Attorney, Agent, or Firm* — Jeffrey T. Holman

(57) ABSTRACT

A user interface element identification system, including: a display device to display the user interface, wherein the user interface is configured to: assign at least two machine readable visual artifacts to a graphical element in the user interface; position the machine readable visual artifacts in different locations within the element, wherein the locations of the artifacts designate a metadata attribute for the element; and display the machine readable visual artifacts in the user interface on the display device.

17 Claims, 4 Drawing Sheets

METHOD FOR TAGGING ELEMENTS IN A USER INTERFACE

BACKGROUND

When an error occurs on a desktop or other user interface, one method of portraying that problem for support purposes is to present a screenshot or image of the user interface with the error visible to a support person. The error may be displayed in a pop-up dialog window or other visible indication to the user. This method is simple and does not require the user to locate and interpret log messages.

Unfortunately, conventional implementations of this method require human interpretation of the image of the user interface, which may lead to improper identification. Additional difficulties may be presented because a user interface may include a combination of several individual, common components, and a pop-up dialog window may be associated with any of the components currently active in the user interface. Message identifiers (IDs) including a combination of alphanumeric characters may be used to overcome some of these problems.

SUMMARY

Embodiments of a system are described. In one embodiment, the system is a user interface element identification system. The system includes: a display device to display the user interface, wherein the user interface is configured to: assign at least two machine readable visual artifacts to a graphical element in the user interface; position the machine readable visual artifacts in different locations within the element, wherein the locations of the artifacts designate a metadata attribute for the element; and display the machine readable visual artifacts in the user interface on the display device. Other embodiments of the system and embodiments of a computer program product and a method are also described.

Other aspects and advantages of embodiments of the present invention will become apparent from the following detailed description, taken in conjunction with the accompanying drawings, illustrated by way of example of the principles of the invention.

BRIEF DESCRIPTION OF THE DRAWINGS

Throughout the description, similar reference numbers may be used to identify similar elements.

DETAILED DESCRIPTION

Figure 1:
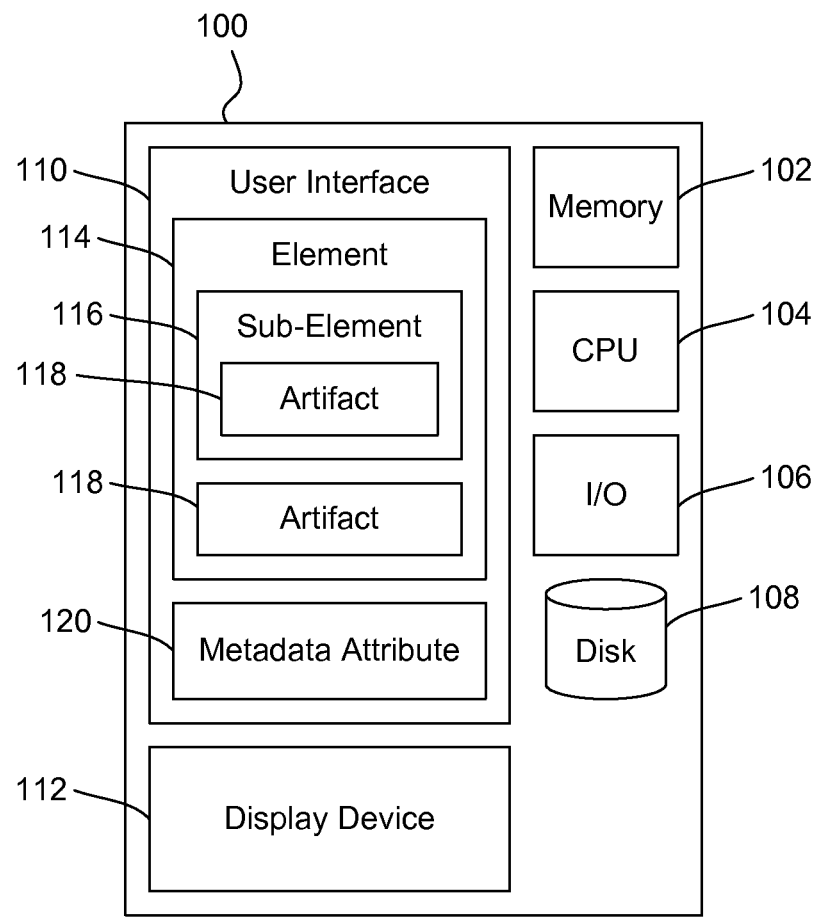
FIG. 1 depicts a schematic diagram of one embodiment of a user interface element identification system.

It will be readily understood that the components of the embodiments as generally described herein and illustrated in the appended figures could be arranged and designed in a wide variety of different configurations. Thus, the following more detailed description of various embodiments, as represented in the figures, is not intended to limit the scope of the present disclosure, but is merely representative of various embodiments. While the various aspects of the embodiments are presented in drawings, the drawings are not necessarily drawn to scale unless specifically indicated.

The present invention may be embodied in other specific forms without departing from its spirit or essential characteristics. The described embodiments are to be considered in all respects only as illustrative and not restrictive. The scope of the invention is, therefore, indicated by the appended claims rather than by this detailed description. All changes which come within the meaning and range of equivalency of the claims are to be embraced within their scope.

Reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussions of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize, in light of the description herein, that the invention can be practiced without one or more of the specific features or advantages of a particular embodiment. In other instances, additional features and advantages may be recognized in certain embodiments that may not be present in all embodiments of the invention.

Reference throughout this specification to "one embodiment," "an embodiment," or similar language means that a particular feature, structure, or characteristic described in connection with the indicated embodiment is included in at least one embodiment of the present invention. Thus, the phrases "in one embodiment," "in an embodiment," and similar language throughout this specification may, but do not necessarily, all refer to the same embodiment.

While many embodiments are described herein, at least some of the described embodiments present a system and method for identifying or designating an element in a user interface. More specifically, the system is able to tag an element in the user interface using at least two machine readable visual artifacts that can be recognized using optical character recognition. The positioning of the artifacts on the user interface may define one or more metadata attributes for the element, including an identity of the element, a version of the element, a cardinality of the element with respect to other elements in the user interface, and/or other attributes.

In advertising, retail packaging, and shipping industries, barcodes are one type of machine readable visual artifact that are used to easily identify objects. For example, a single or double dimension barcode may be added to packaging without interfering with the ease of use of the item and get confused with any of the other artifacts (labels, pictures, writing, etc.) on the packaging. This allows packages to be automatically identified by the barcodes assigned to the packages.

However, adding similar identifying barcodes to a desktop user interface in a computing device takes up valuable space on the display device. In addition, a single window for a desktop user interface may include many components and messages that could all require tagging. This would potentially result in many artifacts taking up space on the user interface, which may be impractical for some embodiments of user interfaces using previous and present technologies.

Conventional display devices have not had sufficient resolution capabilities to allow placement of barcodes or other visible identifiers for elements within a dialog window, but advances in display device technology are allowing higher resolutions to be used. With the introduction of high resolution screens in personal computing and mobile computing devices, problems with display space and usability when adding message IDs or other artifacts to the user interface may be resolved or lessened. Resolutions that meet and even exceed the Full Aperture 4K Standard allows the placement of such artifacts with little impact on the appearance of the user interface.

Barcodes, such as quick response (QR) codes, may be able to store only a limited amount of information. In some embodiments of a computing environment, a barcode used to tag an element in a user interface is able to store metadata information corresponding to the element. Because of the limitations of how much information barcodes may hold, the metadata information that can be extracted from the barcode itself may be limited by the amount of data the barcode is able to store.

The system and method described herein places at least two barcodes or other artifacts in specific locations within or proximate an element that the artifacts identify. Placing multiple artifacts or multiple copies of a single artifact in predetermined locations allows metadata information about the element to be stored and extracted based on the positioning of the artifacts. High resolution displays allow the artifacts to be placed without interfering with the usability of the user interface.

Figure 4:
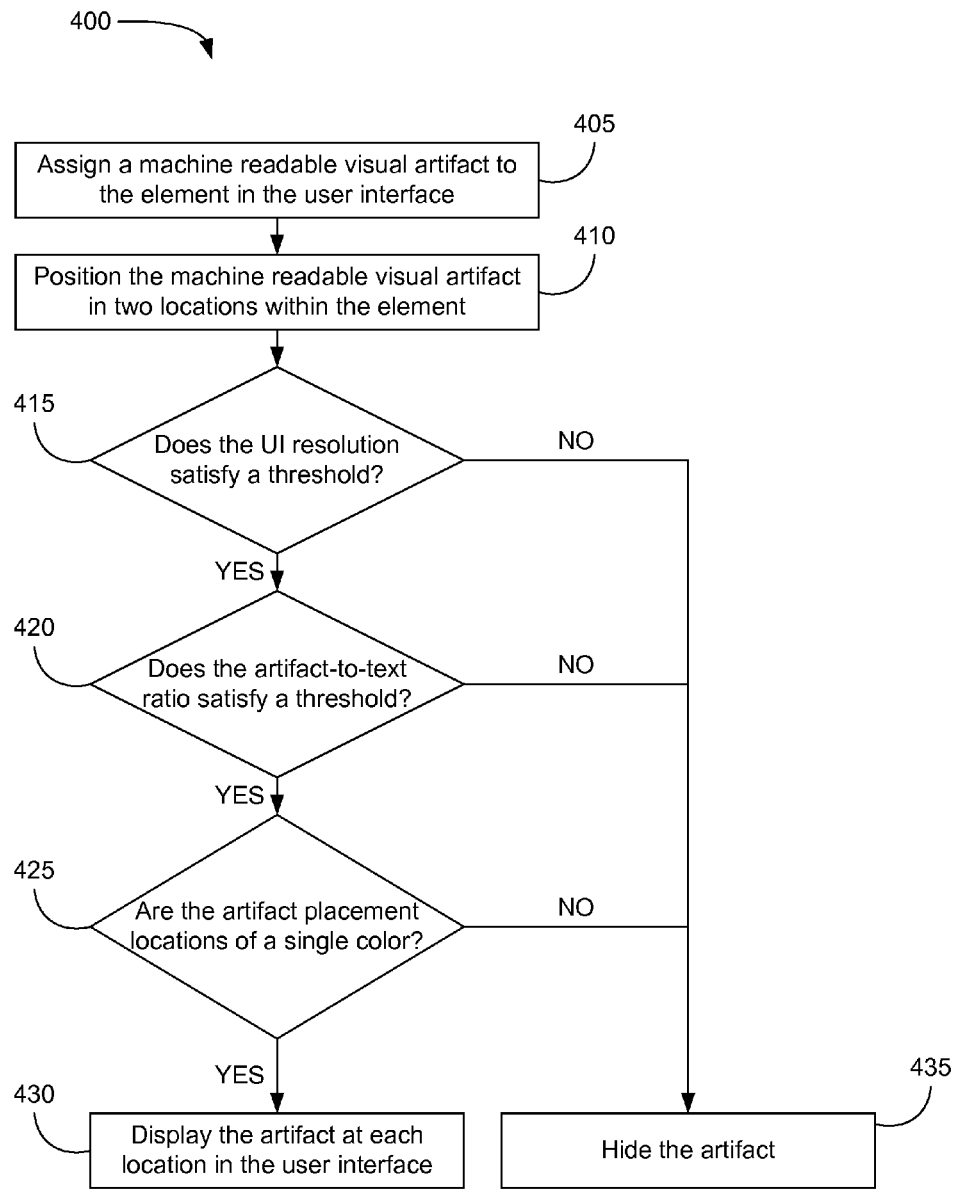
FIG. 4 depicts a flow chart diagram of one embodiment of a method for identifying an element in a user interface.

FIG. 1 depicts a schematic diagram of one embodiment of a user interface element identification system 100. The depicted element identification system 100 includes various components, described in more detail below, that are capable of performing the functions and operations described herein. In one embodiment, at least some of the components of the element identification system 100 are implemented in a computer system. For example, the functionality of one or more components of the element identification system 100 may be implemented by computer program instructions stored on a computer memory device 102 and executed by a processing device 104 such as a CPU. The element identification system 100 may include other components, such as a disk storage drive 108, input/output devices 106, a user interface 110, and a display device 112. Some or all of the components of the element identification system 100 may be stored on a single computing device or on a network of computing devices. The element identification system 100 may include more or fewer components or subsystems than those depicted herein. In some embodiments, the element identification system 100 may be used to implement the methods described herein as depicted in FIG. 4.

In one embodiment, the user interface 110 is displayed on a display device 112 for a computing device. The computing device may be any computing device, including a desktop computer, laptop computer, mobile phone or other mobile device, or any other computing device capable of displaying a user interface 110. The user interface 110 may receive inputs from various sources, including manual input from a user via a mouse, a keyboard, a touch screen, or other input devices. The user interface 110 may also output the data in the user interface 110 onto the display device 112, such that the user interface 110 and any graphical elements 114 in the user interface 110 may be displayed to the user.

The user interface 110 may include any number of elements 114. A user interface element 114 may include a dialog window, an application window, a block of text, or any other visual component in a user interface 110. The element 114 may display data to the user. In some embodiments, the element 114 may include information corresponding to an error report.

In some embodiments, the element 114 includes one or more sub-elements 116. For example, the element 114 may be a dialog window that includes text. The text may be a sub-element 116 within the dialog window. Each element 114 and each sub-element 116 may be individually identified by the system 100. The system 100 may identify each element 114 by assigning an artifact 118 that acts as a unique element identifier (ID) to each element 114 and each sub-element 116. The user interface 110 may include any type of hierarchy or layout to include any number of elements 114 or sub-elements 116. Further, each sub-element 116 may also include additional sub-elements 116. In some embodiments, the artifacts 118 may be inserted into the user interface 110 at a toolkit level, rather than at a development level.

In one embodiment, each element 114 and sub-element 116 has a metadata attribute 120 that describes an identity of the element 114 or sub-element 116, or that describes a configuration of the element 114 or sub-element 116. In one embodiment, the metadata attribute 120 describes a version of the element 114, such as an application version corresponding to the element 114 or sub-element 116. In some embodiments, the artifact 118 for an element 114 may define certain attributes 120 for the element 114, as well as certain attributes 120 of any sub-elements 116 nested within the element 114. For example, the artifact 118 may describe a user interface element 114, such as a dialog window, and indicate that the component contains a message. In some embodiments, the system 100 may describe the elements 114 and sub-elements 116 completely independently of each other.

The display device 112 may display any or all of the elements 114 and sub-elements 116. In some embodiments, the display device 112 displays the entire user interface 110. In other embodiments, the display device 112 displays only a portion of the user interface 110 at a single time.

Figure 2:
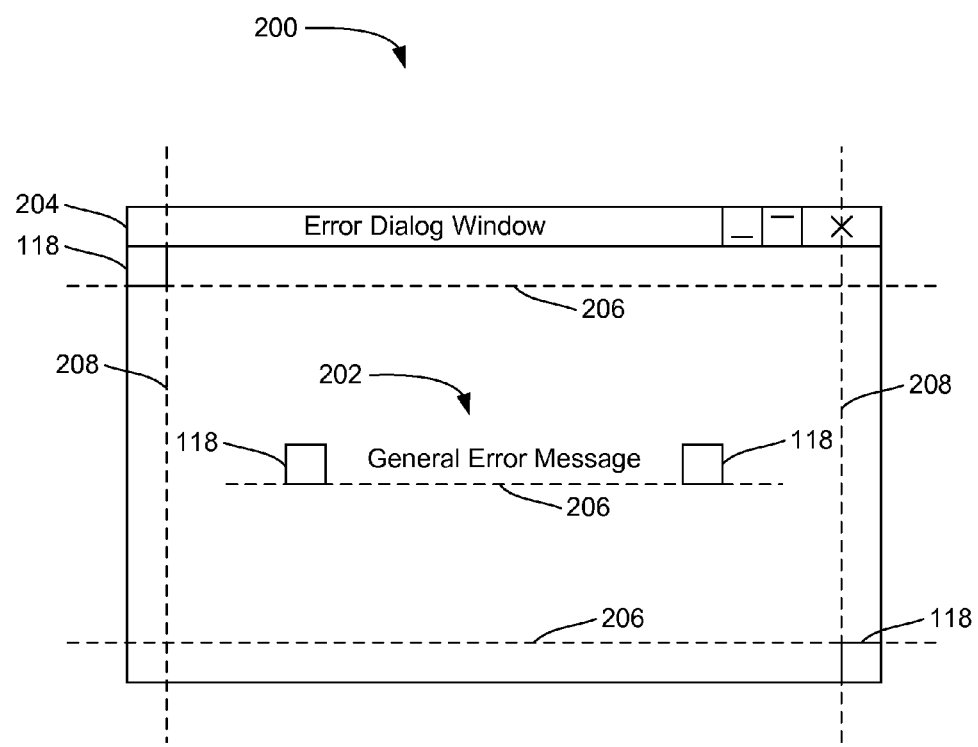
FIG. 2 depicts a schematic diagram of one embodiment of a dialog window.

FIG. 2 depicts a schematic diagram of one embodiment of a dialog window 200. While the user interface element identification system 100 is described herein in conjunction with the dialog window 200 of FIG. 2, the user interface element identification system 100 may be used in conjunction with any dialog window 200 or user interface element 114.

In one embodiment, the dialog window 200 is an error pop-up dialog window 200. Errors occurring in a user interface 110 may correspond to an application running in the user interface 110, an operating system on the computing device, or to some other aspect of the user interface 110. Typically, when an error occurs, the user interface 110 presents the error to the user on the display device 112 in a pop-up dialog window 200 or some other method that includes a general error message 202 describing the error.

In some embodiments, the error message 202 displayed to the user includes a technical description of the error, which can be difficult for users to understand. Because the error description may be difficult for users to interpret or understand, the users may also have trouble communicating the error correctly to a support service. This may result in improper identification of the error, at times, which may prolong any troubleshooting of the problem. Providing an automated solution for identifying the error may allow for quick and easy resolution of the error.

In one embodiment, the system 100 assigns a unique artifact 118, such as QR codes, to each of the elements 114 in the user interface 110. For example, the system 100 assigns a first QR code to the error dialog window 200 and a second QR code to the error message 202 in the dialog window 200. The system 100 may assign a QR code to the error message 202 due to the limited amount of information that may be stored in the QR code. While a 20×20 QR code, for example, is very small on a display with a 4-thousand pixel display, a 20×20 QR code is still limited to about 45 characters. Consequently, assigning a separate QR code to the dialog window 200 and to the error message 202 may allow the system 100 to use smaller QR codes that are less visible on the display device 112.

When each element 114 is assigned a QR code, the system 100 may display the QR code for a given element 114 in two locations within or proximate the element 114. In the present embodiment, copies of the first QR code that corresponds to the dialog window 200 are displayed in corners of the dialog window 200 such that the copies of the QR code are generally diagonal from each other, or are on a separate x-axis 206 and y-axis 208. Copies of the second QR code that corresponds to the general error message 202 are displayed on each side of the error message 202, such that the copies of the second QR code are on the same x-axis 206. In other embodiments, the copies of the second QR code may be displayed above and below the error message 202 such that the copies of the second QR code are on the same y-axis 208.

In one embodiment, positioning the QR codes at opposite corners of the element 114 may indicate a boundary of the element 114. In one embodiment, the QR codes are not placed on the title bar 204 of the element 114, such that the element boundary excludes the area included in the title bar 204.

By positioning the QR codes for the dialog window 200 and the message 202 within the dialog window 200 in different location configurations, a QR code reader associated with a support service is able to determine what type of element 114 is associated with each set of QR codes. The position of the QR codes may include metadata information associated with an identity of the element 114, in addition to any of the other metadata information stored in the QR codes themselves, including element versions, application information, and other data. For example, when a user sending a screenshot of an error message 202 in an error pop-up dialog window 200 to a support service, the support service may interpret the error by reading the QR codes displayed with each element 114. The QR code reader may be able to determine that the diagonal QR codes (or diagonal copies of a single QR code not located on the same x-axis 206 or y-axis 208) indicate that an error dialog window 200 is present in the image. The QR code reader may be able to determine further that an error message 202 is present in the image based on the positioning of the QR codes on the same x-axis 206 or y-axis 208. In other embodiments, the QR codes for the dialog window 200 are displayed on the same x-axis 206 or y-axis 208 and the QR codes for the error message 202 are displayed on different x-axis 206 and y-axis 208.

In some embodiments, the QR codes (or other artifacts 118) for a single element 114 are identical copies of a single QR code assigned to the element 114. In other embodiments, the QR codes for a single element 114 are distinct QR codes that have been assigned to the element 114. The system 100 may also assign any number of artifacts 118 to a single element 114, or any number of copies of a single artifact 118 to the element 114. The location of the combination of artifacts 118 may determine the type of element 114 with which the artifacts 118 are associated, or other types of metadata related to the element 114.

Figure 3:
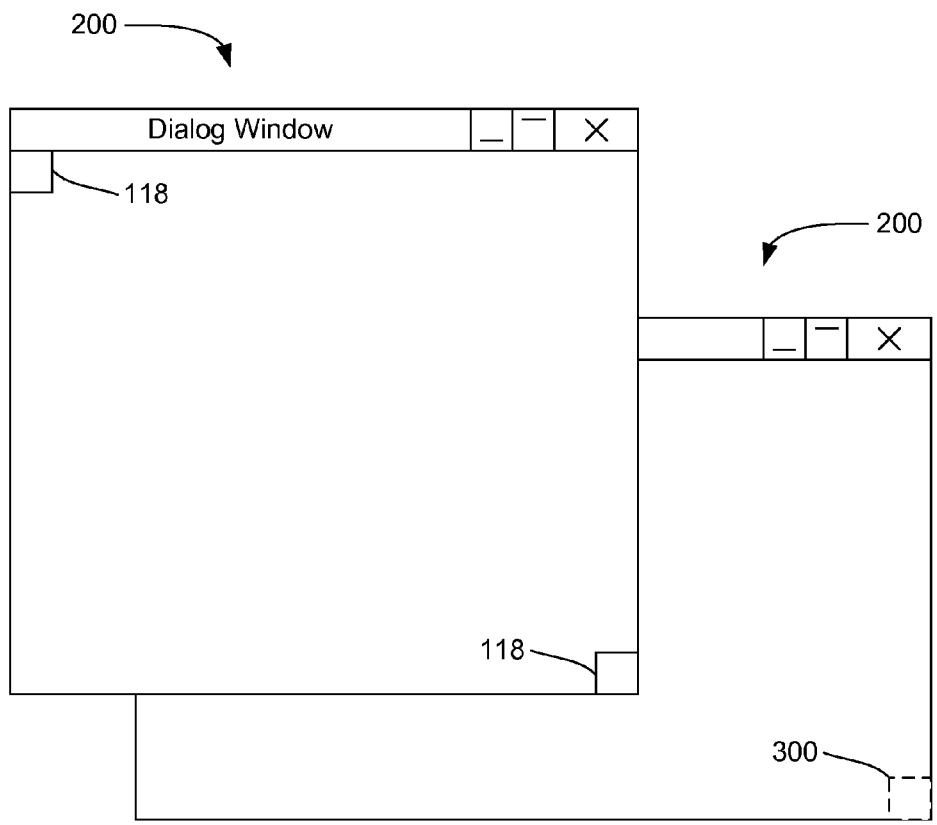
FIG. 3 depicts a schematic diagram of one embodiment of a plurality of dialog windows.

FIG. 3 depicts a schematic diagram of one embodiment of a plurality of dialog windows 200. In one embodiment, when determining whether to display the artifacts 118 associated with each element 114, the system 100 checks various aspects of the user interface 110 and/or elements 114.

The system 100 may check a current resolution of the user interface 110 displayed on the display device 112. If the resolution of the user interface 110 is not above a certain resolution threshold, the system 100 does not display any artifacts 118. In one embodiment, the user may have an option to manually display the artifacts 118 associated with a specific element 114 or group of elements 114, regardless of whether the user interface 110 meets the resolution threshold.

The system 100 may also check a ration of the size of the artifacts 118 with a size of the smallest font in the user interface 110. If the ratio of artifact size to font size is large, the artifacts 118 may be distracting or may interfere with usability of the user interface 110. This may be especially relevant when a user is using certain accessibility interface tools, including a magnifier tool that magnifies selected portions of the user interface 110 on the display device 112. A high ratio of artifact size to font size may cause the artifacts 118 to be clearly visible to the user when the area around the artifact 118 is magnified. Consequently, the system 100 may determine to hide the artifacts 118 if the ratio is above a predetermined ratio threshold.

The system 100 may also check the colors of locations 300 where the artifacts 118 are to be rendered. In one embodiment, if the artifact location 300 includes more than one color, the system 100 hides the artifact 118. More than one color in the area where the artifact 118 is to be rendered may make it difficult for an artifact reader to accurately distinguish the artifact 118 from the colors surrounding the artifact 118, especially if the colors around the artifact 118 are similar to or the same as colors in the artifact 118. In another embodiment, if the artifact location 300 includes any color other than white space, the system 100 hides the artifact 118. Other embodiments of the system 100 may alter colors of the areas where the artifacts 118 are to be rendered when displaying the artifacts 118.

In one embodiment, the system 100 determines whether the artifact locations 300 are obscured or blocked by another dialog window 200 or application. In one embodiment, if an artifact location 300 for a given element 114 is obscured by another dialog window 200 or application, all of the artifacts 118 for the given element 114 are hidden by the system 100. In one embodiment, if any of the artifact locations 300 for a parent element of a given child element are obscured by another dialog window 200 or application, the artifacts 118 for the child element are hidden by the system 100. The system 100 may determine that part of an element 114 is blocked by another element 114 without blocking any of the artifacts 118 of the blocked element 114. If this happens, the system 100 may hide all artifacts 118 for the blocked element 114. The system 100 may also hide artifacts 118 for an element 114 that the system 100 determines is out of focus. Additionally, if only one artifact 118 is found that is located within a boundary defined by another element's artifacts 118, the area between the first artifact 118 for the child element and the ending artifact 118 for the parent element may be ignored by the system 100.

In one embodiment, the system 100 may detect that the area within the boundary of the element 114 is not all visible on the display device 112 at a single time, including elements 114 with scrollable areas. The artifacts 118 corresponding to such an element 114 may be placed at the corners of the viewable area of the element 114, rather than at the corners of the full boundary of the element 114. This allows an artifact reader to detect and identify the element 114 even though not all of the content within the element 114 is visible to the user. The system 100 may also detect when an element 114 is resized. If the element 114 is resized such that a set of artifacts 118 positioned on different axes may appear to be on a same axis to an artifact reader, the system 100 may hide the artifacts 118 to prevent the artifact reader from inaccurately identifying the element 114.

FIG. 4 depicts a flow chart diagram of one embodiment of a method 400 for identifying an element 114 in a user interface 110. Although the method 400 is described in conjunction with the user interface element identification system 100 of FIG. 1, embodiments of the method 400 may be implemented with other types of interface element identification systems 100.

In one embodiment, the system 100 assigns 405 at least two machine readable visual artifacts 118 to an element 114 in the user interface 110. In one embodiment, the two machine readable visual artifacts 118 are identical copies of a single visual artifact 118, such as a QR code or other barcode.

The system 100 then positions 410 the machine readable visual artifacts 118 in different locations 300 within the element 114. In one embodiment, the positions for each of the artifacts 118 associated with an element 114 may be determined based on an element type corresponding to the element 114. The element type describes a function and an appearance of the element 114 in the user interface 110. For example, if the element type is an error dialog window 200, the artifacts 118 may be positioned at corners of a visible boundary or exterior border of the dialog window 200. The artifact locations 300 may indicate the exterior border of the element 114 to an artifact reader. The locations 300 of the artifacts 118 identify a metadata attribute 120 for the element 114 to the artifact reader. The metadata attribute 120 may include one or more of an identity of the element 114, a version of the element 114, or an application associated with the element 114.

In one embodiment, after the artifact locations 300 have been determined, the system 100 displays 430 the artifacts 118 in the user interface 110 on a display device 112. This allows an artifact reader to interpret the artifacts 118 to determine the metadata attributes 120 within each of the artifacts 118 and based on the locations 300 of the artifacts 118 within the element 114.

In some embodiments, the system 100 determines 415 that a resolution of the user interface 110 satisfies a resolution threshold. The resolution threshold may be such that the artifact 118 appears very small on a display device 112 relative to other elements 114 or components within the user interface 110. The system 100 may check 420 a ratio of a size of the artifacts 118 to a size of a font used in the element 114 against a ratio threshold. The system 100 may require the ratio to be below the ratio threshold. The system 100 may also verify 425 that the locations 300 for the artifacts 118 include a single color or that the color of the area of the artifact location 300 is white. If the system 100 detects that any of these do not meet specified requirements, the system 100 may hide 435 the artifacts 118, such that the artifacts 118 are not visible to the user on the display device 112.

In one embodiment, the system 100 assigns additional artifacts 118 to sub-elements 116 or child elements within another element 114. The additional artifacts 118 for a sub-element 116 may be copies of an identical artifact 118 that is unique to the sub-element 116. The additional artifacts 118 identify at least one metadata attribute 120 for the sub-element 116, and the location 300 of the additional artifacts 118 may identify further metadata attributes 120.

In one embodiment, the system 100 positions the artifacts 118 for a parent element on a different x-axis 206 and a different y-axis 208 within the boundary of the parent element. The system 100 positions the artifacts 118 for any child elements on the same x-axis 206 or on the same y-axis 208, depending on the desired configuration. In this manner, an artifact reader may be able to distinguish between a parent element and a child element based on the positioning of the artifacts 118. If the artifacts 118 are on the same x-axis 206 or y-axis 208, the artifact reader may determine that the element 114 is a sub-element 116. If the artifacts 118 are on different x-axis 206 and y-axis 208, the element 114 is a parent element. In other embodiments, the system 100 may position artifacts 118 for parent elements on the same axes, and the artifacts 118 for child elements on different axes. In other embodiments, the system 100 may distinguish between elements 114 based on a number of artifacts 118 or copies of artifacts 118 assigned to the element 114 and displayed on the display device 112.

In one embodiment, the system 100 hides all of the artifacts 118 for a given element 114 in response to determining that one or more of the artifacts 118 is outside the boundary of the user interface 110. In another embodiment, the system 100 hides the artifacts 118 for a given element 114 if any part of the element 114 is obscured by another element 114 or if the element 114 is not in focus.

An embodiment of a user interface element identification system 100 includes at least one processor coupled directly or indirectly to memory elements through a system bus such as a data, address, and/or control bus. The memory elements can include local memory employed during actual execution of the program code, bulk storage, and cache memories which provide temporary storage of at least some program code in order to reduce the number of times code must be retrieved from bulk storage during execution.

It should also be noted that at least some of the operations for the methods may be implemented using software instructions stored on a non-transitory computer useable storage medium for execution by a computer. As an example, an embodiment of a computer program product includes a computer useable storage medium to store a computer readable program that, when executed on a computer, causes the computer to perform operations, including an operation for identifying an element in a user interface 110.

Although the operations of the method(s) herein are shown and described in a particular order, the order of the operations of each method may be altered so that certain operations may be performed in an inverse order or so that certain operations may be performed, at least in part, concurrently with other operations. In another embodiment, instructions or sub-operations of distinct operations may be implemented in an intermittent and/or alternating manner.

Embodiments of the invention can take the form of an entirely hardware embodiment, an entirely software embodiment, or an embodiment containing both hardware and software elements. In one embodiment, the invention is implemented in software, which includes but is not limited to firmware, resident software, microcode, etc.

Furthermore, embodiments of the invention can take the form of a computer program product accessible from a computer-usable or computer-readable medium providing program code for use by or in connection with a computer or any instruction execution system. For the purposes of this description, a computer-usable or computer readable medium can be any apparatus that can contain, store, communicate, propagate, or transport the program for use by or in connection with the instruction execution system, apparatus, or device.

The computer-useable or computer-readable medium can be an electronic, magnetic, optical, electromagnetic, infrared, or semiconductor system (or apparatus or device), or a propagation medium. A computer readable storage medium or device is a specific type of computer-readable or -usable medium. Examples of a computer-readable storage medium include a semiconductor or solid state memory, magnetic tape, a removable computer diskette, a random access memory (RAM), a read-only memory (ROM), a rigid magnetic disk, and an optical disk. Hardware implementations including computer readable storage media also may or may not include transitory media. Current examples of optical disks include a compact disk with read only memory (CD-ROM), a compact disk with read/write (CD-R/W), and a digital video disk (DVD).

Input/output or I/O devices (including but not limited to keyboards, displays, pointing devices, etc.) can be coupled to the system either directly or through intervening I/O controllers. Additionally, network adapters also may be coupled to the system to enable the data processing system to become coupled to other data processing systems or remote printers or storage devices through intervening private or public networks. Modems, cable modems, and Ethernet cards are just a few of the currently available types of network adapters.

In the above description, specific details of various embodiments are provided. However, some embodiments may be practiced with less than all of these specific details. In other instances, certain methods, procedures, components, structures, and/or functions are described in no more detail than to enable the various embodiments of the invention, for the sake of brevity and clarity.

Although specific embodiments of the invention have been described and illustrated, the invention is not to be limited to the specific forms or arrangements of parts so described and illustrated. The scope of the invention is to be defined by the claims appended hereto and their equivalents.

What is claimed is:

1. A computer program product, comprising:
    a computer readable storage medium to store a computer readable program, wherein the computer readable program, when executed by a processor within a computer, causes the computer to perform operations for designating a graphical element displayed in a user interface, the operations comprising:
        assigning at least two machine readable visual artifacts to the element, wherein the machine readable visual artifacts are identical artifacts;
        positioning the machine readable visual artifacts in different locations within the element, wherein the locations of the artifacts identify a metadata attribute for the element; and
        displaying the machine readable visual artifacts in the user interface on a display device.

2. The computer program product of claim 1, wherein the computer readable program, when executed on the computer, causes the computer to perform additional operations, comprising:
    determining the locations for the machine readable visual artifacts based on an element type corresponding to the element, wherein the element type describes a function and an appearance of the element in the user interface.

3. The computer program product of claim 1, wherein the locations for the machine readable visual artifacts indicate an exterior border of the element.

4. The computer program product of claim 1, wherein the computer readable program, when executed on the computer, causes the computer to perform additional operations, comprising:
    determining that a resolution of the user interface satisfies a resolution threshold;
    determining that a ratio of a size of the machine readable visual artifacts to a size of a smallest font corresponding to the element is below a ratio threshold; and
    verifying that the locations for the artifacts comprise a single color.

5. The computer program product of claim 1, wherein the computer readable program, when executed on the computer, causes the computer to perform additional operations, comprising:
    assigning at least two additional machine readable visual artifacts to a sub-element within the element, wherein the additional machine readable visual artifacts designate a metadata attribute for the sub-element; and
    positioning the artifacts for the element on a different x-axis and a different y-axis within the element; and
    positioning the artifacts for the sub-element on one of a plurality of major axes of the user interface, wherein the plurality of major axes comprise a plurality of x- and y-axes.

6. The computer program product of claim 1, wherein the computer readable program, when executed on the computer, causes the computer to perform additional operations, comprising:
    hiding all of the machine readable visual artifacts for the element in response to determining that any of the machine readable visual artifacts is outside a boundary of the user interface.

7. A method for designating a graphical element displayed in a user interface, comprising:
    assigning at least two machine readable visual artifacts to the element, wherein the machine readable visual artifacts are identical artifacts;
    positioning the machine readable visual artifacts in different locations within the element, wherein the locations of the artifacts designate a metadata attribute for the element; and
    displaying the machine readable visual artifacts in the user interface on a display device.

8. The method of claim 7, further comprising:
    determining the locations for the machine readable visual artifacts based on an element type corresponding to the element, wherein the element type describes a function and an appearance of the element in the user interface.

9. The method of claim 7, wherein the locations for the machine readable visual artifacts indicate an exterior border of the element.

10. The method of claim 7, further comprising:
    determining that a resolution of the user interface satisfies a resolution threshold;
    determining that a ratio of a size of the machine readable visual artifacts to a size of a smallest font corresponding to the element is below a ratio threshold; and
    verifying that the locations for the artifacts comprise a single color.

11. The method of claim 7, further comprising:
    assigning at least two additional machine readable visual artifacts to a sub-element within the element, wherein the additional machine readable visual artifacts identify a metadata attribute for the sub-element; and
    positioning the artifacts for the element on a different x-axis and a different y-axis within the element; and positioning the artifacts for the sub-element on one of a plurality of major axes of the user interface, wherein the plurality of major axes comprise a plurality of x- and y-axes.

12. The method of claim 7, further comprising:
hiding the machine readable visual artifacts in response to determining that any part of the element is obscured in the user interface.

13. A user interface element identification system, comprising:
a display device to display the user interface, wherein the user interface is configured to:
assign at least two machine readable visual artifacts to a graphical element in the user interface, wherein the machine readable visual artifacts are identical artifacts;
position the machine readable visual artifacts in different locations within the element, wherein the locations of the artifacts designate a metadata attribute for the element; and
display the machine readable visual artifacts in the user interface on the display device.

14. The system of claim 13, wherein the locations for the machine readable visual artifacts indicate an exterior border of the element.

15. The system of claim 13, wherein the user interface is further configured to:
determine that a resolution of the user interface satisfies a resolution threshold;
determine that a ratio of a size of the machine readable visual artifacts to a size of a smallest font corresponding to the element is below a ratio threshold; and
verify that the locations for the artifacts comprise a single color.

16. The system of claim 13, wherein the user interface is further configured to:
assign at least two additional machine readable visual artifacts to a sub-element within the element, wherein the additional machine readable visual artifacts designate a metadata attribute for the sub-element; and
position the artifacts for the element on a different x-axis and a different y-axis within the element; and
position the artifacts for the sub-element on one of a plurality of major axes of the user interface, wherein the plurality of major axes comprise a plurality of x- and y-axes.

17. The system of claim 13, wherein the user interface is further configured to hide all of the machine readable visual artifacts in response to determining that any of the machine readable visual artifacts is outside a boundary of the user interface.

* * * * *